United States Patent [19]

Lachaussee

[11] 4,170,284

[45] Oct. 9, 1979

[54] LINEAR TRANSFER DEVICE FOR DISPLACING BODIES ON AN ASSEMBLY MACHINE

[75] Inventor: Maurice Lachaussee, Ans, Belgium

[73] Assignee: Etablissements Lachaussee, Societe Anonyme, Belgium

[21] Appl. No.: 863,593

[22] Filed: Dec. 22, 1977

[30] Foreign Application Priority Data

Dec. 28, 1976 [BE] Belgium .............................. 0173694

[51] Int. Cl.$^2$ .......................................... B65G 23/12
[52] U.S. Cl. .................................... 198/345; 198/742
[58] Field of Search ............... 198/345, 459, 740, 742, 198/747, 339, 830; 214/1 BB; 209/539, 916

[56] References Cited

U.S. PATENT DOCUMENTS

| | | | |
|---|---|---|---|
| 3,185,187 | 5/1965 | Luther | 198/836 X |
| 3,613,331 | 10/1971 | Garrett | 198/740 X |
| 4,079,829 | 3/1978 | Belyshev | 198/345 |

Primary Examiner—Robert B. Reeves
Assistant Examiner—Douglas D. Watts
Attorney, Agent, or Firm—Hill, Van Santen, Steadman, Chiara & Simpson

[57] ABSTRACT

A device to transfer bodies along a path between the work positions on an assembly machine having a table and feed means for delivering bodies in a row, the device comprising a matrix bar extending above and parallel to the table of the machine on one side of the path of the bodies, the bar being carried by a lever mounted on a pivot and the bar having in at least one longitudinal edge and at regular intervals cut-outs whose profile is adapted to the periphery of the bodies; a rake constituted by a shaft extending parallel to the matrix bar on the other side of the path of the bodies and carrying a plurality of teeth spaced along the shaft with the same spacing as the cut-outs in the matrix bar, the shaft being mounted in bearings fixed on the machine for lengthwise translatory movement through advance and return strokes and for rotational movement about its longitudinal axis; a straight edge overlying the shaft, the straight edge being positioned in the same plane as the matrix bar and extending parallel thereto, the straight edge thereby serving as a backing means for the bodies accommodated in the cut-outs in the matrix bar; a guide bar positioned under the matrix bar and extending parallel to the shaft such that it continuously presses the bodies accommodated in the cut-outs against the shaft of the rake; a driving mechanism for the matrix bar to actuate the lever carrying the matrix bar in order periodically to move the matrix bar into such an operative position that the cut-outs engage the bodies and into inoperative position when the cut-outs are clear of bodies; and a rake control mechanism coupled to the shaft of the rake.

2 Claims, 8 Drawing Figures

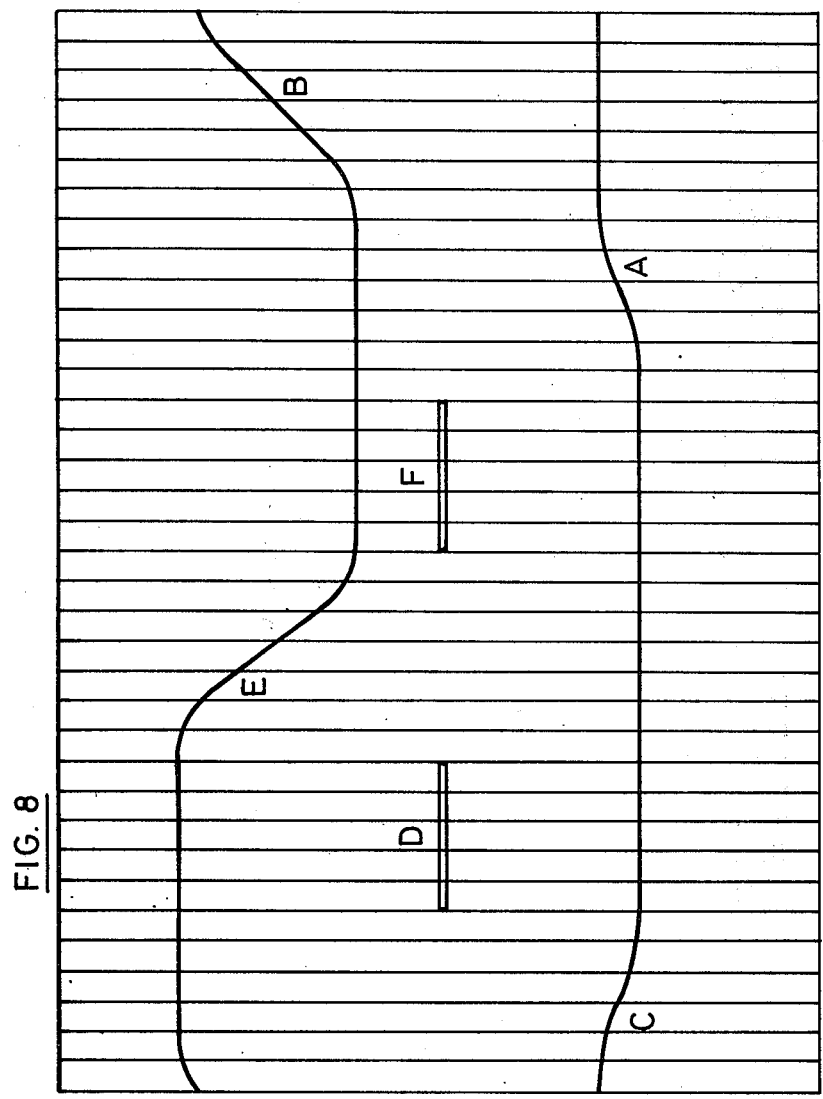

LINEAR TRANSFER DEVICE FOR DISPLACING BODIES ON AN ASSEMBLY MACHINE

FIELD OF THE INVENTION

This invention relates to a linear transfer device to displace bodies between the various work stations on an assembly machine such as, for example, a cartridge-making machine.

In known assembly machines the transfer devices used are of three types: either devices with circular and alternating displacements or devices with continuous motion or devices with linear displacement.

Devices of the first two types comprise complex assemblies of transfer elements mounted on pivots to displace the bodies along a succession of curved paths and complex drive mechanisms to transmit the circular and/or alternating movements to the transfer elements mounted on pivots. Devices of this type are, of course, complex and expensive and they have only a relatively limited transfer rhythm. Furthermore, access to all the work stations is often difficult.

Devices of the third type are less complicated: they comprise either a linear-displacement transfer chain to displace the bodies between the work stations or a device with a claw or with blocks propelled in alternating movements. However, the transfer chain undergoes deformation making operations at the work stations inaccurate as a result of poor centering of the bodies at the work stations. Moreover, devices with claws or blocks are complicated and expensive. Like the other known devices, these types of transfer device prevent an elevated transfer rhythm from being achieved, as poor centering of the bodies increase with the transfer rhythm.

SUMMARY OF THE INVENTION

The object of the invention is a simple transfer device capable of achieving an elevated transfer rhythm, while guaranteeing accurate centering of the bodies at each work station.

The device according to the invention is characterised in that it includes a matrix bar extending above and parallel to the table of the machine on one side of the path of the bodies, said bar being carried by a lever mounted on a pivot and said bar having in at least one longitudinal edge and at regular intervals cut-outs whose profile is adapted to the periphery of the bodies; a rake constituted by a shaft extending parallel to the matrix bar on the other side of the path of the bodies and bearing a series of teeth having the same spacing as the cut-out in the matrix bar, said shaft being mounted in bearings fixed to the machine so that it can be displaced in an axial translatory movement and can rotate about its axis; a mechanism controlling the matrix bar designed to actuate the lever carrying the matrix bar in such a way as periodically to bring the latter into position so that the cut-outs partially surround the bodies and periodically to separate the matrix bar from the bodies; and a rake control mechanism coupled to the shaft of the rake and designed to impart, while the matrix bar is in the applied position, in succession a first rotary movement of said shaft so as to disengage the teeth from the bodies, a translatory movement by a specific number of body positions backwards and a second rotary movement in the direction opposite to that of the first rotary movement so as to engage the teeth between the bodies again, the end of this second rotary movement occurring before the matrix bar is separated from the bodies.

A special feature of this device is that it enables any body being manufactured to be cleared easily.

DESCRIPTION OF THE DRAWINGS

FIG. 8 is a graph illustrating the operating sequences of the elements of the transfer device.

DESCRIPTION OF AN EMBODIMENT

Figure 1:
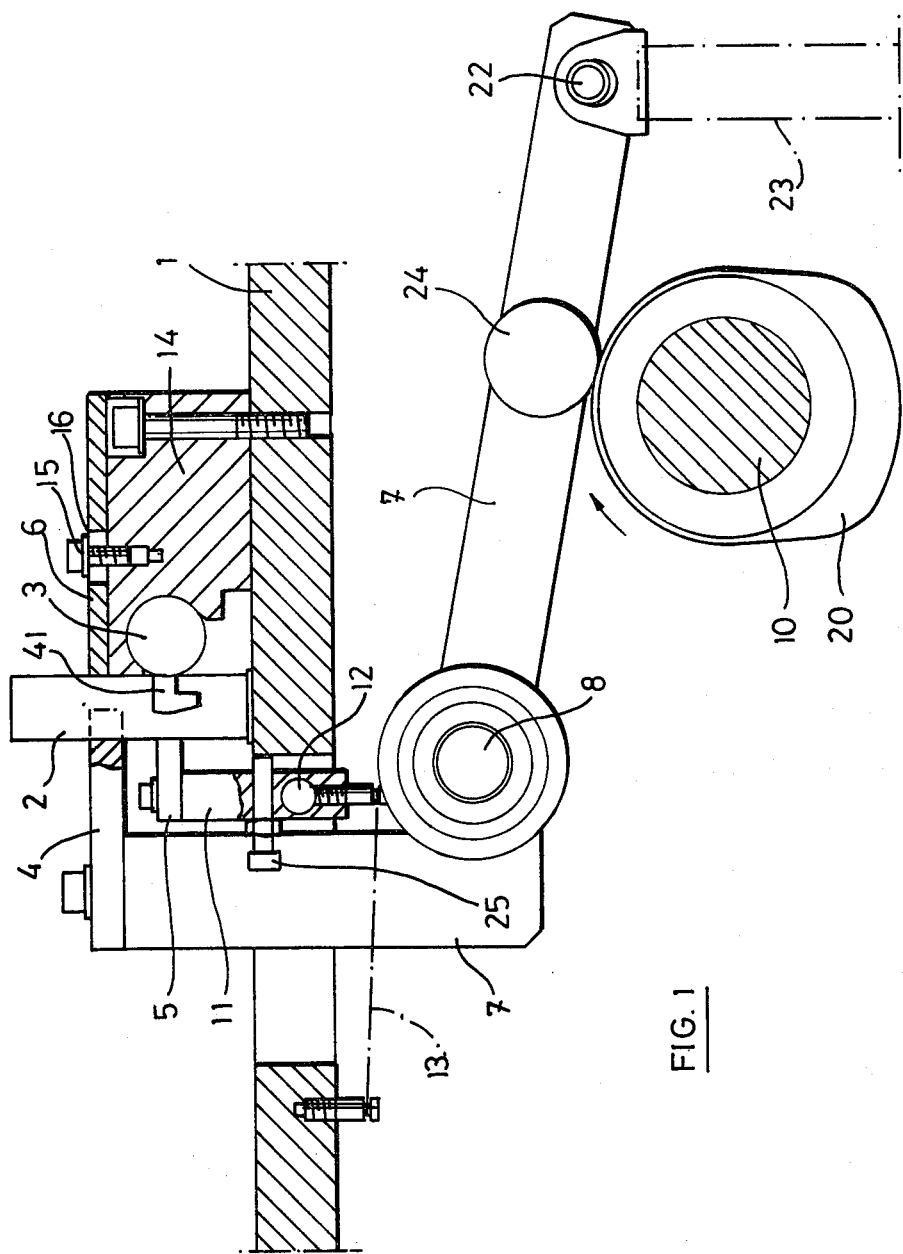
FIG. 1 is a side elevation in partial section of a cartridge-making machine having the transfer device according to the invention.
Figure 2:
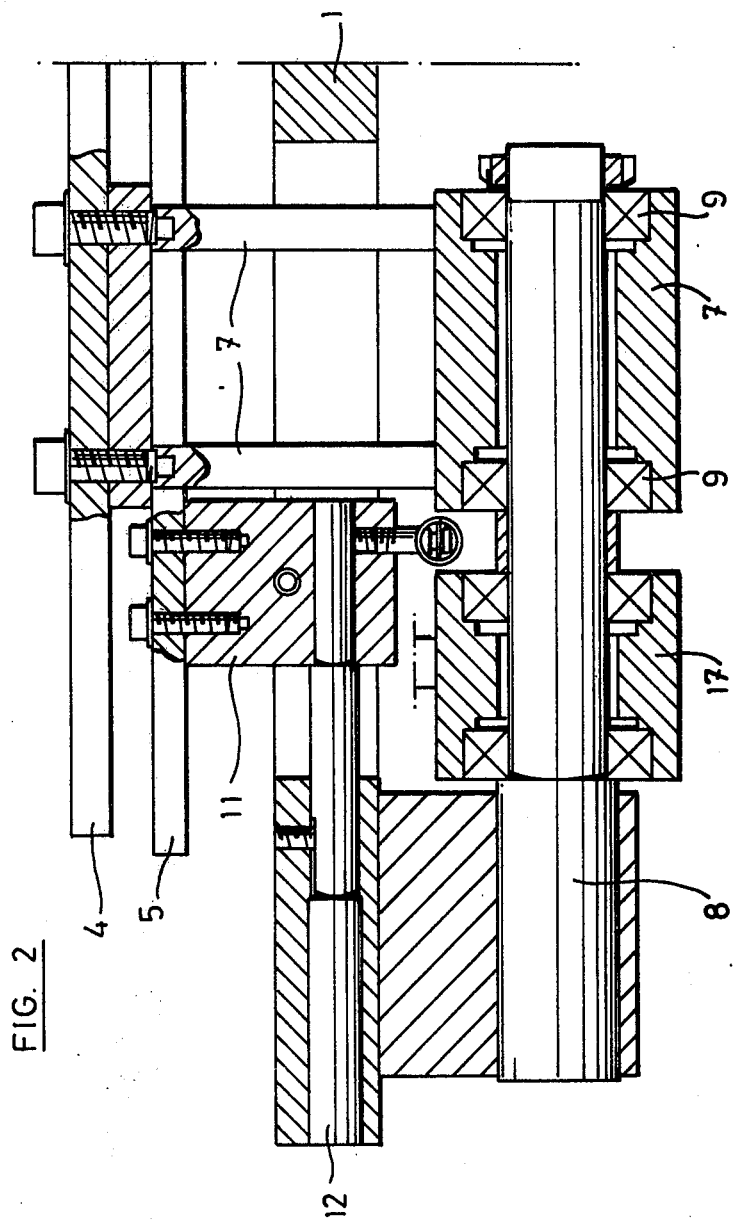
FIG. 2 is a longitudinal elevation in partial section of the machine of FIG. 1.
Figure 3:
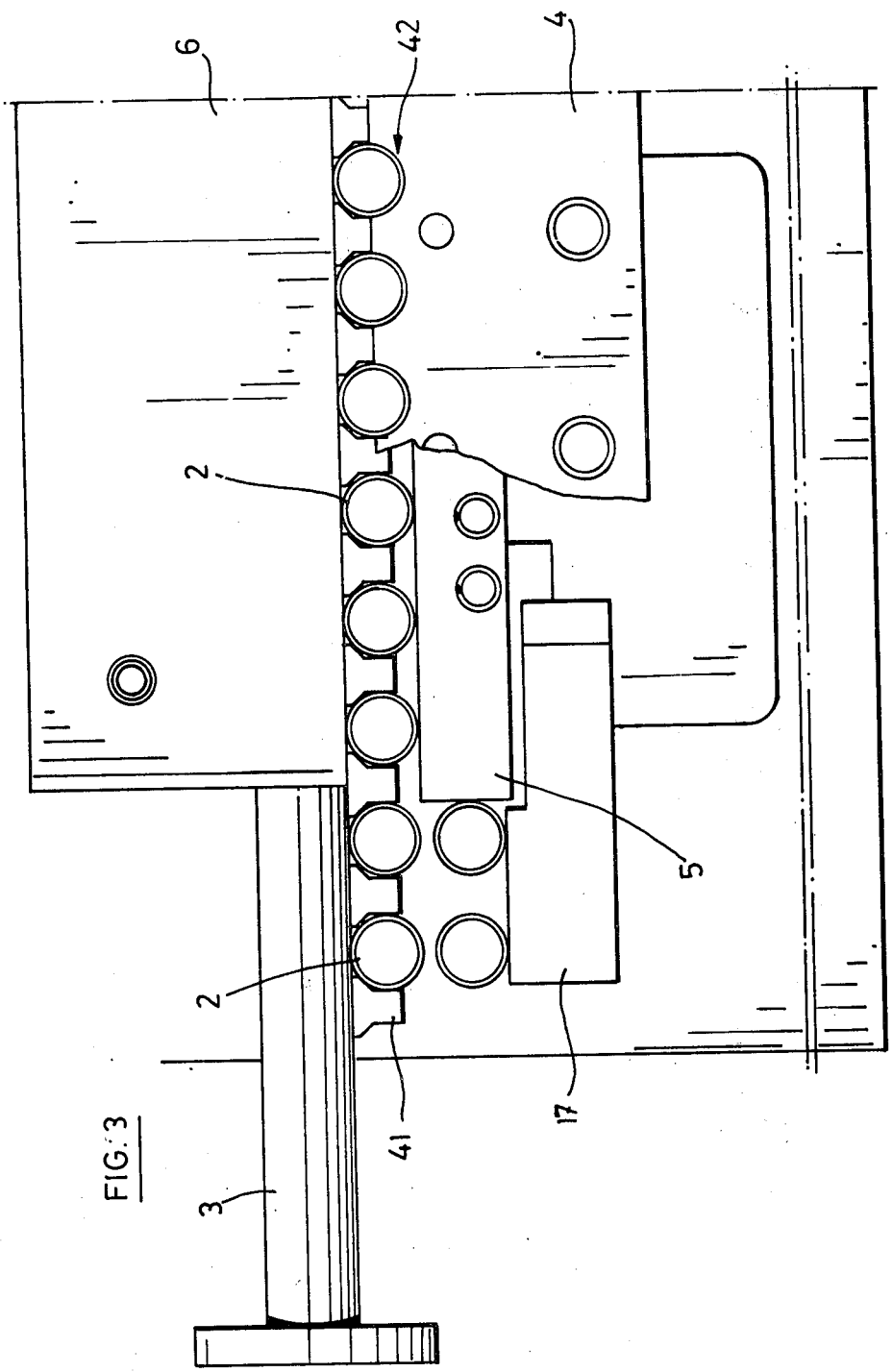
FIG. 3 is a plan view, partly exposed, of the machine of FIG. 1.

The following description relates to a cartridge-making machine on which the transfer device according to the invention is provided. In FIGS. 1 and 2 the table of the machine is identified by reference number 1. The work stations necessary for making the cartridges are distributed along this table and the cases serving to make the cartridges are brought to the table 1 by a lever 17 mounted on the axle 8 (on the left looking at FIG. 3) and are displaced to the right in succession. The cases move on the table 1 in the axis of the case 2 represented in FIG. 1 and FIG. 3.

The cases are displaced on the table 1 by a transfer device according to the invention, comprising substantially a rake 3, a matrix bar 4, a retractable guide bar 5 and a straight edge 6. The interaction of these four elements is described hereinafter.

The rake 3 consists of a shaft equipped with teeth 41 engaging on bearings 14. The matrix bar 4 consists of a bar extending parallel to the table 1 and having on its edge turned towards the rake 3 cut-outs 42, each having a profile capable of surrounding a part of the case 2. The matrix bar 4 is carried on the end of the vertical leg of an L-shaped level 7 mounted on a pivot 8 by means of ball bearings 9; on the other leg of the lever 7 are fixed a roller 24 and a bracket 22. The retractable guide bar 5 is mounted on the end of a support 11 hinged on a pivot 12 fixed to the table 1, the bar 5 being maintained in the normal position by the action of a spring 13 and by the adjustable stop 25. The straight edge 6 is fixed on the bearings 14 by means of adjusting screws 15. Holes 16 are provided in the straight edge 6 in order to adjust its position in relation to the position of the cases 2.

Figure 4:
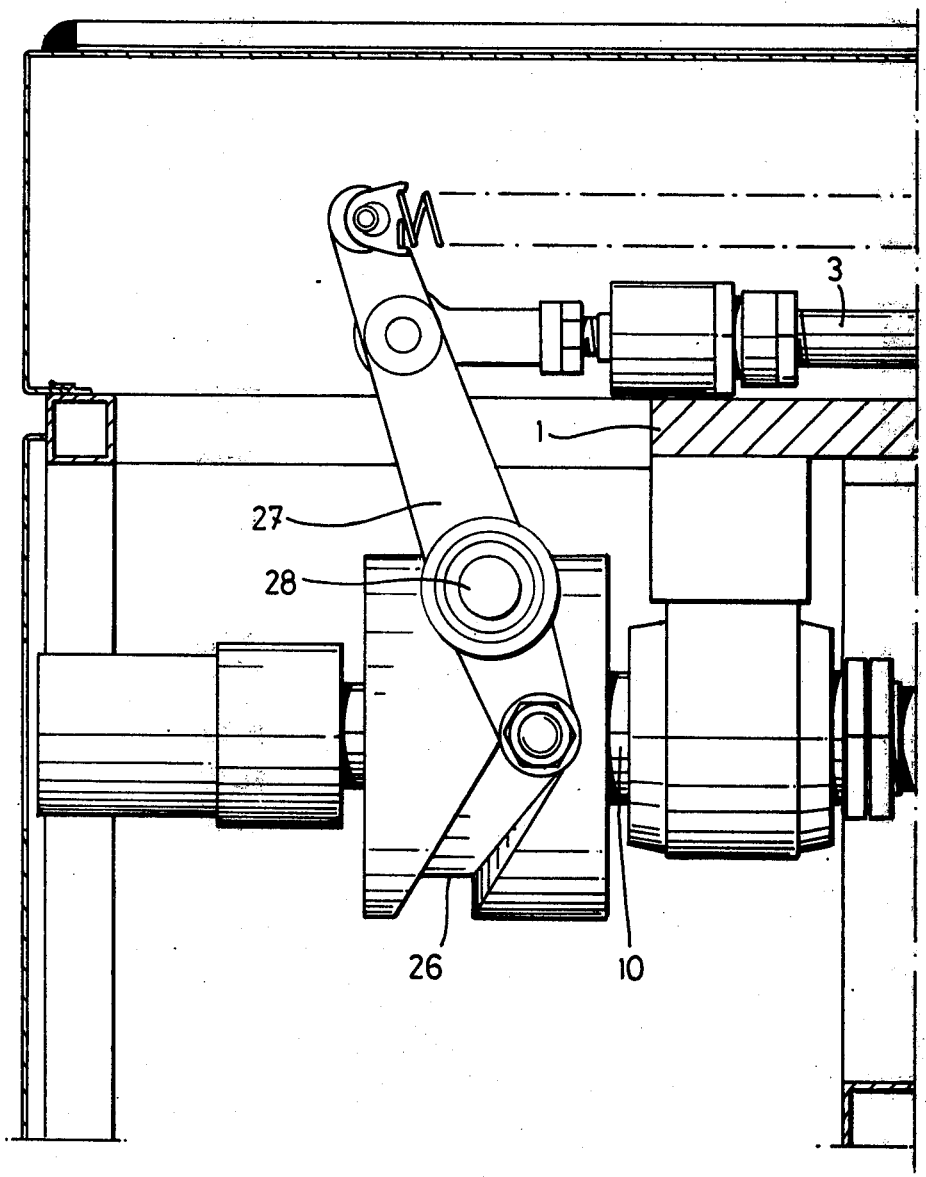
FIGS. 4 and 5 are an embodiment of the rake control mechanisms.
Figure 5:
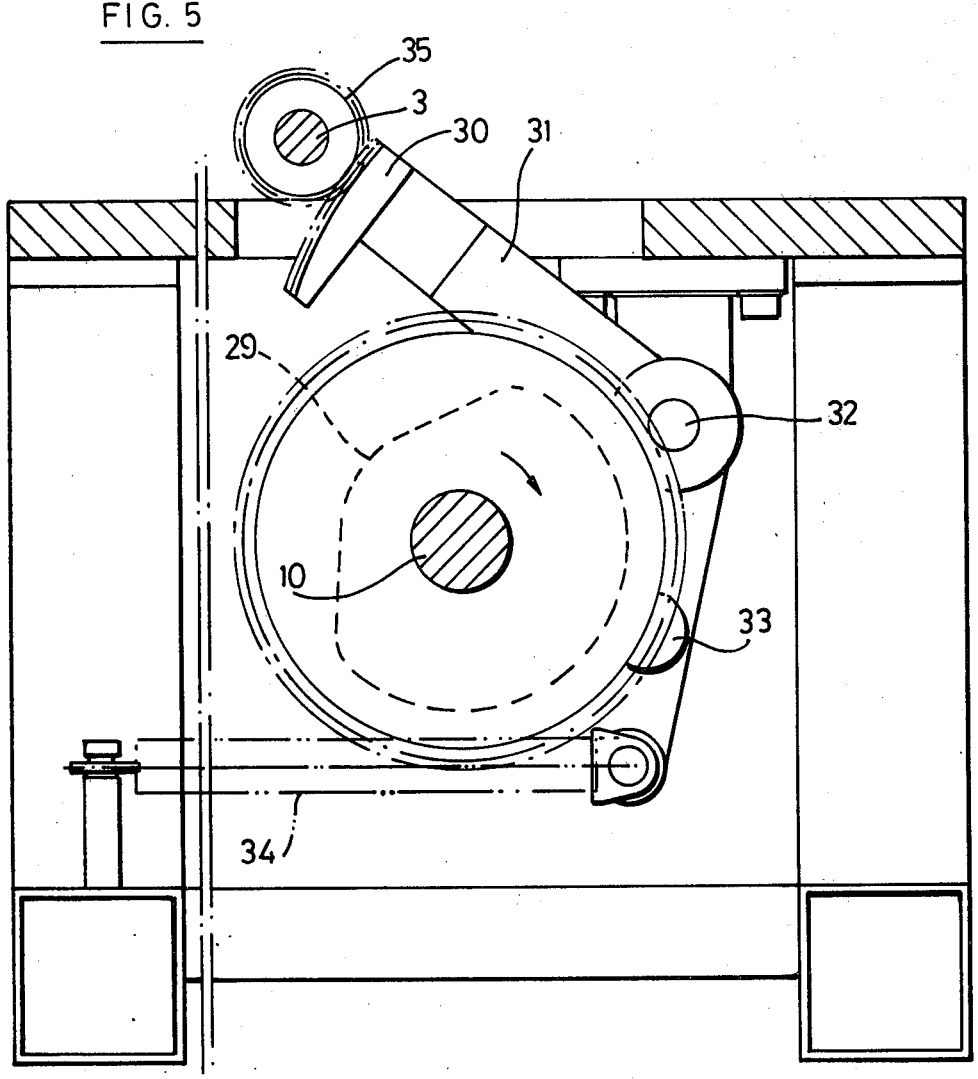

The matrix bar 4 and the rake 3 are actuated by cam mechanisms mounted on a camshaft 10 running along the table 1. The mechanism controlling the matrix bar 4 can be seen in FIG. 1, while the mechanisms controlling the rake 3 are shown in FIGS. 4 and 5.

Figure 6:
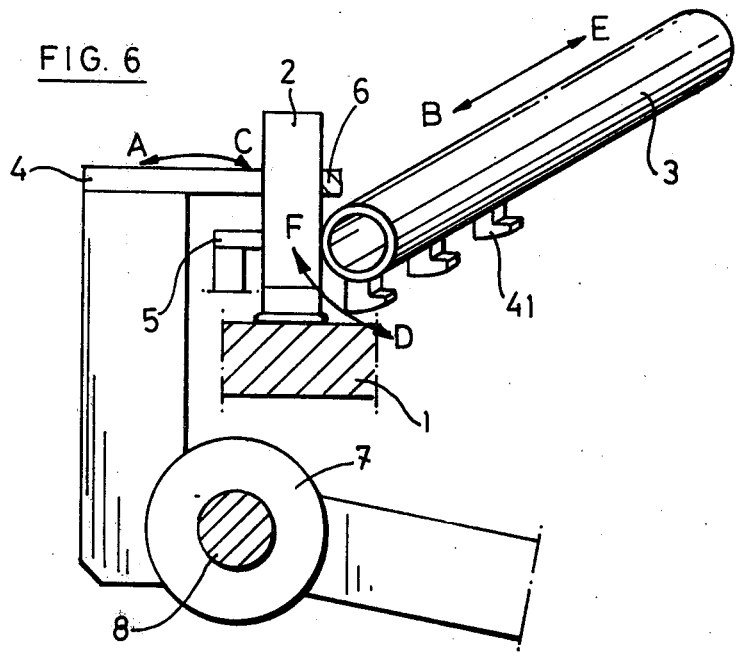
FIGS. 6 and 7 are sketches intended to explain the movements of the elements constituting the transfer device according to the invention.
Figure 7:
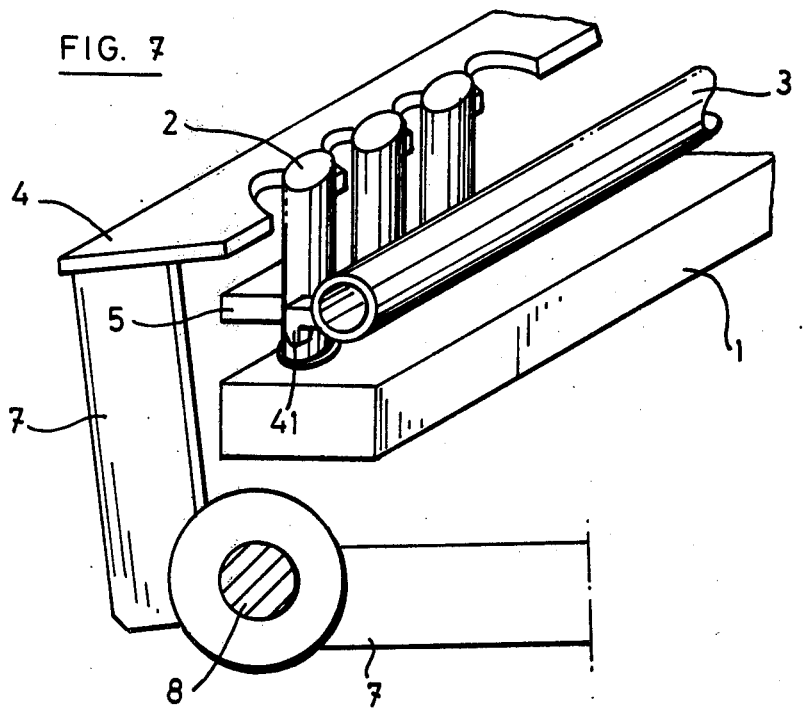

Before these mechanisms are described in more detail, it is necessary to analyse the coordinated movement of the rake 3 and the matrix bar 4 to drive the case simultaneously one behind the other. For this purpose, reference is made to the sketches in FIGS. 6 and 7. The positions shown in FIG. 6 for the matrix bar 4 and the rake 3 are those corresponding to one phase of operations at the various work stations. The matrix bar 4 retains all the cases 2 in its cut-outs 42, the cases being backed up by the straight edge 6. The guide bar 5 runs opposite the bearing line of the rake 3 against the cases 2. Each case is thus held at at least four points, thereby ensuring accurate centering thereof during the cartridge-making operations.

While the operations are being completed, the rake 3 is displaced by a longitudinal translatory movement backwards by one or more case positions (that is, towards the point of introduction of the cases) in the direction of the arrow E after which is it propelled in a rotary movement in the direction of the arrow F in order to bring the teeth 41 between the successive cases. As soon as the operations are completed, the rake 3 is displaced by a translatory movement by one position forwards in the direction of the arrow B and when the cases occupy their new positions the rake 3 is propelled in a rotary movement in the direction of the arrow D, disengaging the teeth 41 while the required operations are being carried out on the cases. These displacements of the rake are thus repeated at a regular and rapid rhythm.

During these movements of the rake the matrix bar 4 is actuated in the direction of the arrow A by its control mechanism, so as to disengage the cases from the moment when the teeth of the rake engaged between the cases and therefore retain the latter until the moment when the cases displaced by translation of the rake have been put into their new positions. The sequence of the movements of the rake 3 and matrix bar 4 is illustrated by the graph in FIG. 8: the upper curve represents the sequence of translatory movements E and B of the rake in time, the levels corresponding to the phases of operations at the work stations; the ranges D and F represent the time intervals during which the rotations of the rake are executed; the lower curve represents the sequence of movements of advance C and withdrawal A of the matrix bar. An interesting feature of the drive mechanism is that the displacements of the case-gripping elements to transfer the cases from one position to the next are carried out during the actual execution of the cartridge-making operations, which gives the machine equipped with this device according to the invention a production rate never achieved by the known machines. Moreover, as the cases are always held at at least four points during the phases of operations, the centering thereof is always very accurate, which contributes to increasing the output of the machine thus equipped according to the invention.

An embodiment of the mechanism controlling the matrix bar 4 is shown by way of example in FIG. 1. The lever 7 hinged on the pivot 8 carries a roller 24 which bears on the profile of a cam 20 mounted on the shaft 10 and also carries a bracket 22 to which a tension spring 23 is hooked. The shaft 10 is controlled by any means not shown (for example, an electric motor) so as to have imparted to it a rotary movement. When the roller 24 is raised by the cam 20, the lever 7 rocks and consequently separates the matrix bar 4 from the cases 2. This mechanism is returned to the position shown in FIG. 1 by the action of the restoring spring 23 controlled by the cam 20.

The mechanism controlling the movement of the rake 3 is shown in FIGS. 4 and 5. FIG. 4 shows, in particular, the elements imparting to the rake 3 its longitudinal translatory movement; FIG. 5 shows, in particular, the elements imparting to the rake 3 its rotary movement.

The translatory movement is controlled by a cam drum 26 mounted on the shaft 10. This cam acts on the rake 3 by means of a lever 27 pivoting on the axle 28.

The rotary movement of the rake 3 is controlled by a flat cam 29 mounted on the same shaft 10 as the other cams of the machine. On the cam 29 rests a roller 23 carried by a lever 31 which pivots about the axle 32. One end of the lever 31 carries a toothed segment 30 interacting with a gear 35 integral with the rake 3. When the cam 29 raises the roller 33, the lever 31 rocks and the toothed segment 30 drives the gear 35, the effect of which is to impart to the rake 3 its rotary movement.

As mentioned above, the cartridge-making machine described by way of illustration is one of many examples of an assembly machine to which the transfer device according to the invention is applicable. It is likewise understood that the mode of execution of this device can include alternatives to that described by a way of example, without departing from the scope of the invention.

What is claimed is:

1. A device to transfer bodies along a path between the work positions on an assembly machine having a table and feed means for delivering bodies in a row, the device comprising:

a matrix bar extending above and parallel to the table of the machine on one side of the path of the bodies, said bar being carried by a lever mounted on a pivot and said bar having in at least one longitudinal edge and at regular intervals cut-outs whose profile is adapted to the periphery of the bodies;

a rake constituted by a shaft extending parallel to the matrix bar on the other side of the path of the bodies and carrying a plurality of teeth spaced along said shaft with the same spacing as the cut-outs in the matrix bar, said shaft being mounted in bearings fixed on the machine for lengthwise translatory movement through advance and return strokes and for rotational movement about its longitudinal axis;

a straight edge overlying said shaft, said straight edge being positioned in the same plane as the matrix bar and extending parallel thereto, said straight edge thereby serving as a backing means for the bodies accommodated in the cut-outs in the matrix bar;

a guide bar positioned under the matrix bar and extending parallel to said shaft such that it continuously presses the bodies accommodated in said cup-outs against the shaft of said rake;

a driving mechanism for the matrix bar to actuate said lever carrying the matrix bar in order periodically to move the matrix bar into such an operative position that the cut-outs engage the bodies and into inoperative position when the cut-outs are clear of bodies; and a rake control mechanism coupled to the shaft of said rake, said mechanism comprising means for rotating said shaft so as to move the teeth into disengaged position from the bodies and into engaged position between the bodies while the matrix bar is driven into operative position, and means for imparting to said shaft lengthwise translatory movement through said advance stroke when the matrix bar is driven into inoperative position and through said return stroke when the matrix bar is driven into operative position.

2. A device according to claim 1, wherein the rake control mechanism comprises a shaft linked kinematically with driving means;

a first lever mounted on a pivot axle and having an end linked kinematically with said rake;

a cam drum mounted on said shaft for pivoting said lever about the pivot axle to reciprocate said rake during rotation of said shaft;

a flat cam mounted on said shaft in a present position relative to said cam drum;

a second lever having a first end linked kinematically with said flat cam and a second end provided with a toothed segment extending in a plane transversely to the longitudinal direction of said rake; and a gear integral with said rake, said gear being linked kinematically with said toothed segment whereby, when said shaft rotates, a rotational movement is imparted to said rake during the time when the latter is not moved lengthwise.

* * * * *